UNITED STATES PATENT OFFICE.

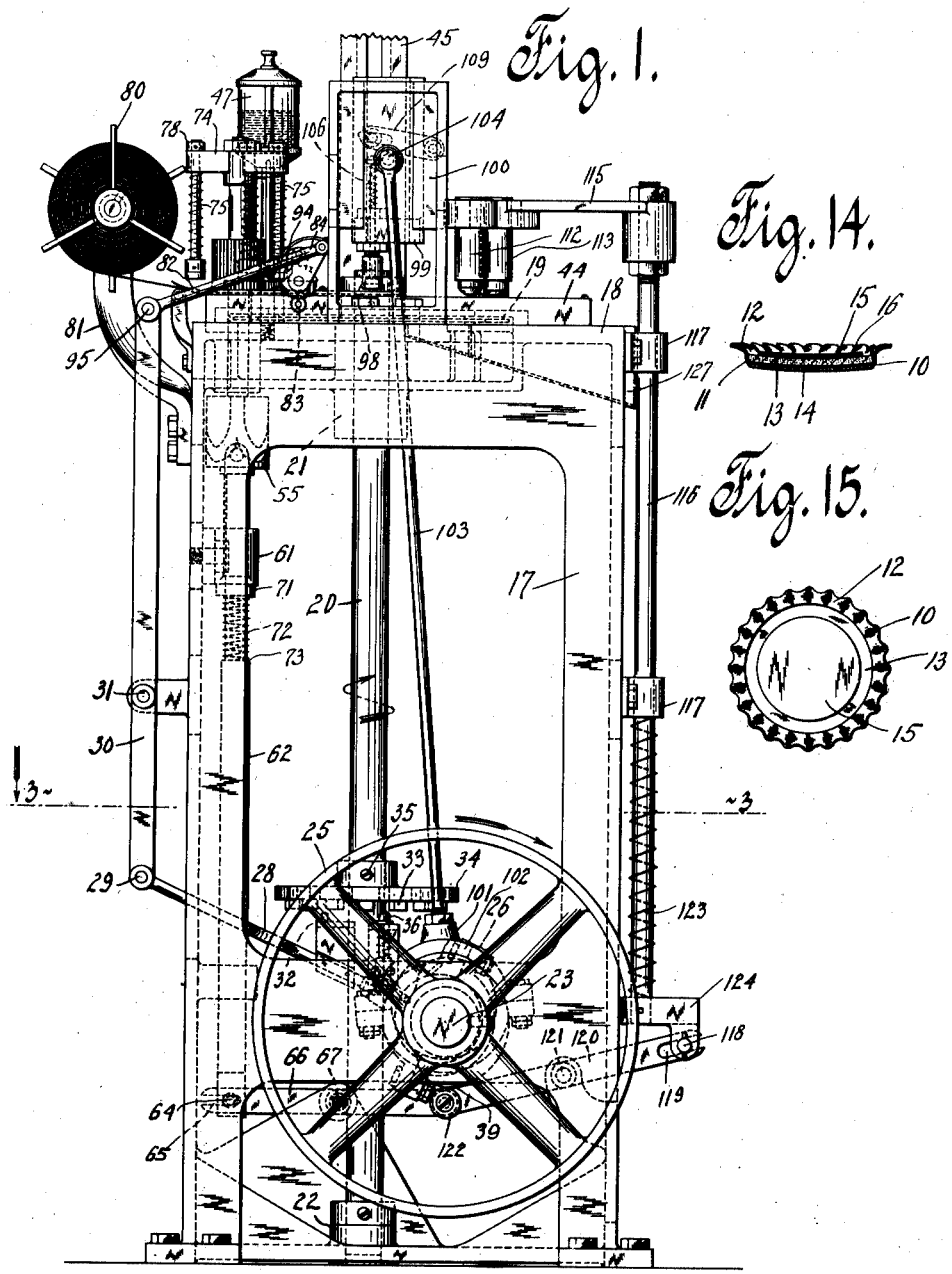

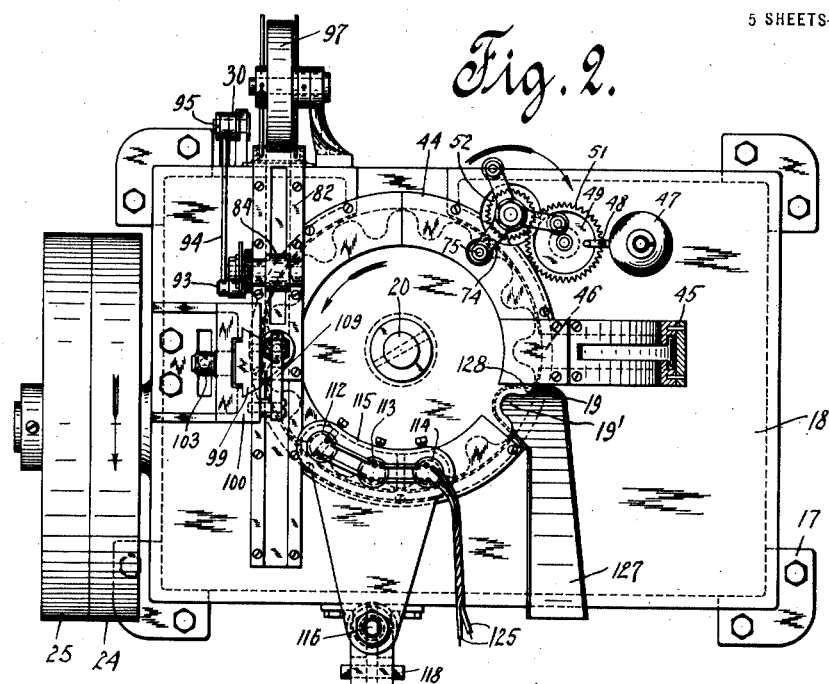

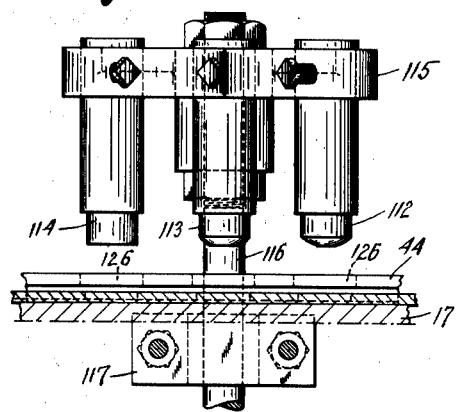
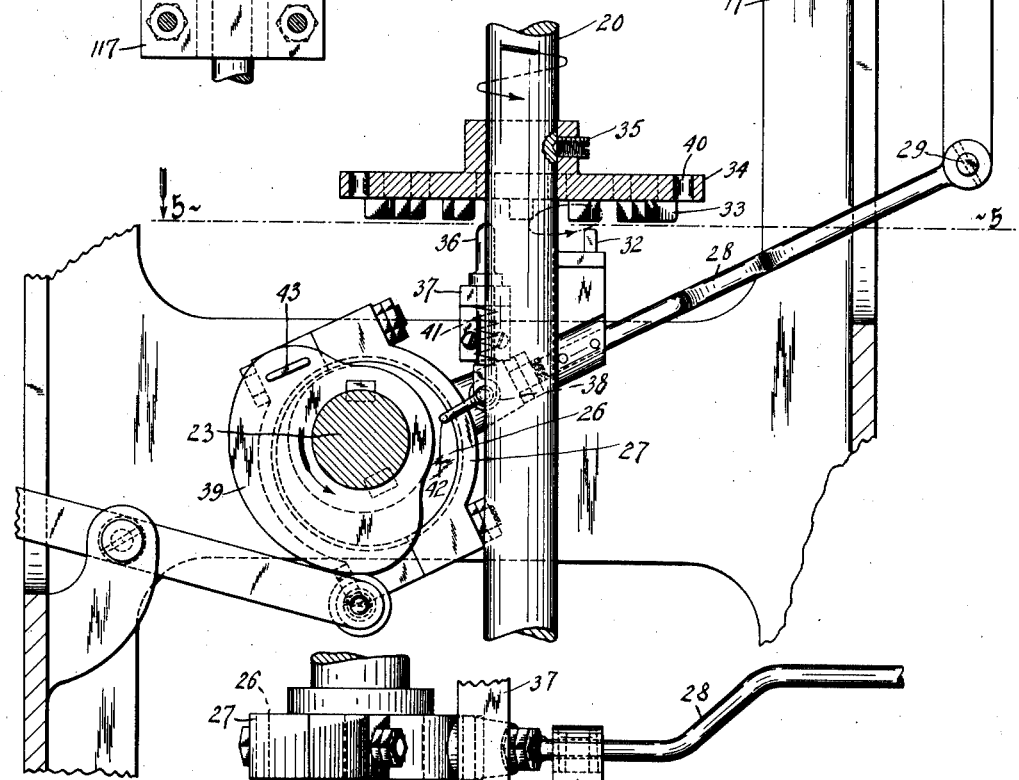
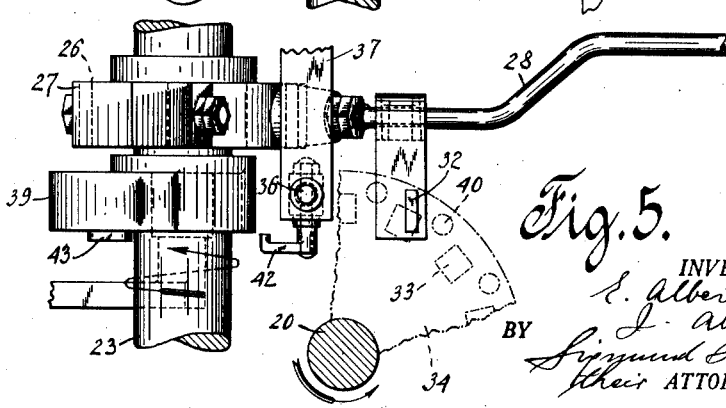

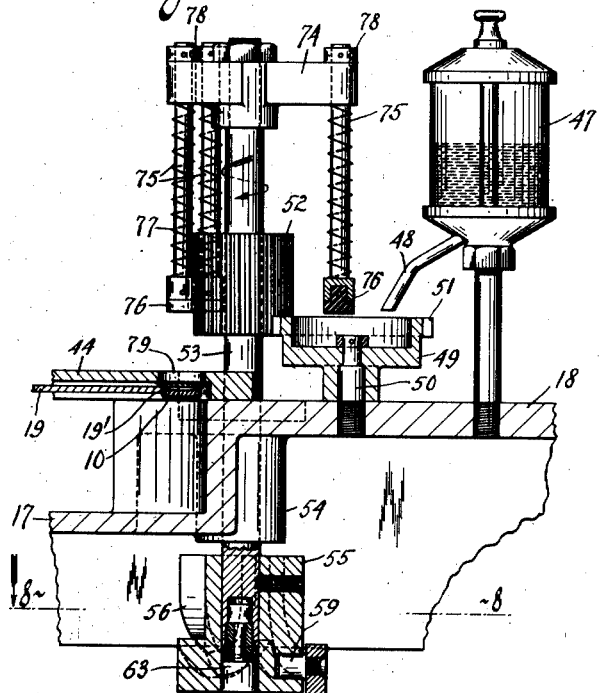

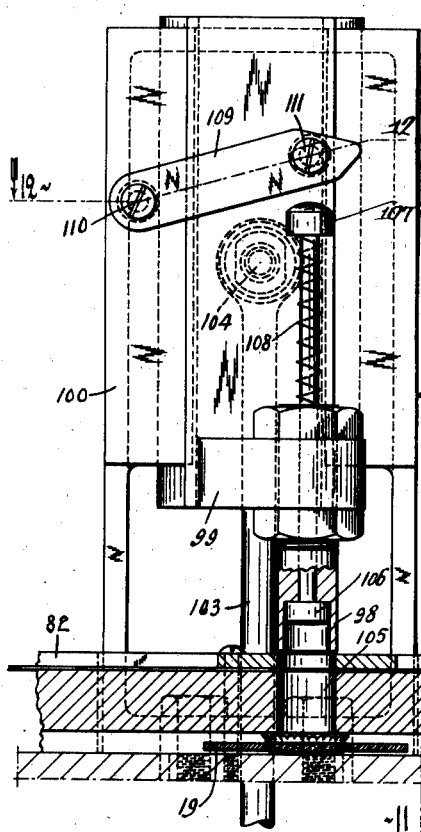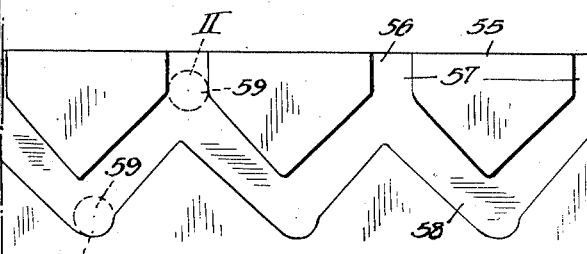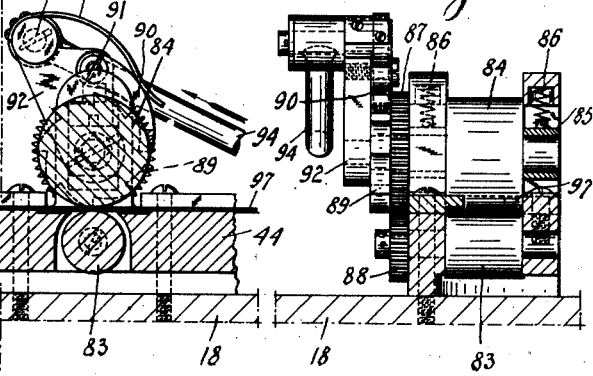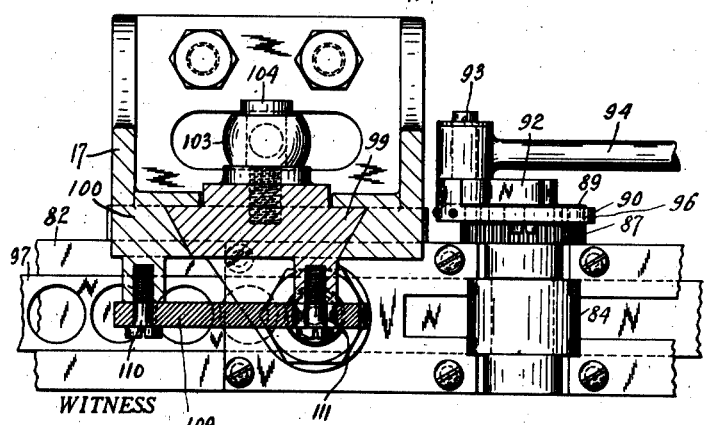

EMILIO ALBERTI AND JOHN ALBERTI, OF NEW YORK, N. Y., ASSIGNORS TO INTERNATIONAL CORK COMPANY, OF BROOKLYN, NEW YORK, A CORPORATION OF NEW YORK.

MACHINE FOR MANUFACTURING CLOSURES FOR BOTTLES AND OTHER RECEPTACLES.

1,401,300. Specification of Letters Patent. Patented Dec. 27, 1921.

Application filed June 19, 1916. Serial No. 104,550.

*To all whom it may concern:*

Be it known that we, EMILIO ALBERTI and JOHN ALBERTI, citizens of the United States, and residents of the city of New York, in the county of Kings and State of New York, have invented certain new and useful Improvements in Machines for Manufacturing Closures for Bottles and other Receptacles, of which the following is a specification.

The present invention relates to a machine for manufacturing closures or stoppers for bottles and other receptacles; more particularly it pertains to closures of the cap variety, including those termed "crown corks."

Closures of this type usually comprise a metallic cap or crown to be locked to the neck of the bottle, etc., and a sealing disk or packing of cork or the like, that is held within the cap, for instance by means of a suitable cementing medium. It has been found in practice that in many cases it is impracticable to permit the liquid contents of the bottle or other receptacle to come into contact with the sealing disk of cork or like material, as some liquids, such as pure water, mineral water, or beverages of delicate flavors, are apt to acquire "a corky taste." The commercial value of such liquids is thus greatly impaired. In order to obviate these and similar defects of the crown corks and like closures, it has been found convenient to cement or otherwise attach a thin protecting disk of ductile metal or other material to the exposed face of the sealing disk of the closure, which protecting disk should preferably be of a diameter that is substantially smaller than that of the sealing disk, but slightly larger than the inner diameter of the neck of the receptacle to which the closure is to be applied.

The main object of the present invention is to provide a simple and efficient machine for applying the protecting disks to the closures.

With this and other objects in view, which will more fully appear as the nature of the invention is better understood, the same consists in the combination, arrangement and construction of parts hereinafter fully described, pointed out in the appended claims and illustrated in the accompanying drawings, it being understood that many changes may be made in the size and proportion of the several parts and details of construction within the scope of the appended claims without departing from the spirit or sacrificing any of the advantages of the invention.

The machine constructed in accordance with this invention comprises, broadly speaking, an intermittently moving closure transporting mechanism, in combination with means for applying a cementing medium to the exposed face of the sealing disks, means for cutting from a strip of metal or other material protecting disks and placing the same into the closures, and heating means for the cementing medium.

One of the many possible embodiments of the invention is illustrated in the accompanying drawings, in which:—

Figure 1 is a side elevation of a machine constructed in accordance with this invention; Fig. 2 is a top plan view of the same; Fig. 3 is a section taken on line 3—3 of Fig. 1; Fig. 4 is a side elevation, partly in section, of the means for actuating the moving parts of the machine; Fig. 5 is a section taken on line 5—5 of Fig. 4; Fig. 6 is a side elevation of the mechanism which applies the cementing means to the exposed faces of the sealing disks of the closures; Fig. 7 is a top plan view thereof; Fig. 8 is a section taken on line 8—8 of Fig. 6; Fig. 9 is a development of a cam shown in Figs. 6 and 8; Fig. 10 is a side elevation of the means for feeding a strip from which the protecting disks are to be cut and the cutting and depositing means coöperating therewith; Fig. 11 is a section taken on line 11—11 of Fig. 10; Fig. 12 is a section taken on line 12—12 of Fig. 10; Fig. 13 is a rear elevation of the heating means of the apparatus; Fig. 14 is a central vertical section taken through a finished closure; and Fig. 15 is a bottom plan view of said closure.

Before describing the machine constructed in accordance with the present invention, the product manufactured thereon will be disclosed in connection with Figs. 14 and 15 of the drawings. In these figures a bottle closure of the crown cork type has been shown for purposes of illustration, it being, however, obvious that the machine may be used for manufacturing generally closures of the cap variety. In Figs. 14 and 15 the numeral 10 indicates a cap, comprising a substantially cylindrical head 11 and a corrugated flange 12, which is adapted to be locked in the well known manner to the exterior of the bottle neck. In the cap is disposed a sealing disk or packing 13 of cork or like material, which is united with the cap, for instance, by an interposed cementing material 14, or in any other suitable manner. To the outer, or in other words to the exposed face of the sealing disk is attached concentrically with the latter a thin layer of material, such as, for instance chemically pure block tin, aluminum, an alloy of tin, or suitably prepared paper. This layer is made in the form of a disk, denoted by the numeral 15, its diameter being smaller than the diameter of the sealing disk and being stuck to the latter by an interposed cementing medium, shown at 16. This cementing medium should, preferably be of a type that is insoluble in liquids after it has set and formed a union between the packing and the protecting disk 15; it should be insoluble at normal temperatures and at temperatures above normal. It has been found in practice that albumen is particularly adapted for use in connection with these caps, it being inodorous, tasteless, soluble in water and thus readily preparable for use. Moreover albumen coagulates easily and is rendered insoluble at about 140° Fahrenheit, the coagulation resulting in a firm union between the packing of cork or the like and the protecting disk, such union being brought about almost instantaneously.

The machine for applying these protecting disks to the closures comprises a frame 17, including a horizontal table portion 18, above the plane of which is arranged a star wheel 19, having recesses or pockets 19', into which are seated crown corks in their inverted positions. This star wheel is attached to a vertical shaft 20, which is suitably journaled in bearings 21 and 22 upon the frame and receives intermittent rotary motion, to rotate in a like manner the star wheel 19 in the direction of the arrow shown in Fig. 2 of the drawings. Any suitable means may be provided for this purpose, the one described herein being disclosed only for purposes of illustration. This means comprises a driving shaft 23, journaled in bearings upon the frame and driven in any suitable manner, for instance it may carry a fixed pulley 24 and a loose pulley 25, over which runs a belt (not shown in the drawings). To the driving shaft is keyed an eccentric 26, to the strap 27 of which is attached a rod 28, that is pivoted at 29 to a lever 30, the latter being fulcrumed at 31 to the frame of the machine. To the rod 28 is fixedly secured an upwardly projecting finger 32, that is adapted to coact with projections 33 upon the underface of a disk 34, the latter being rigidly attached, for instance by a screw 35, to the shaft 20. As the eccentric actuates the rod 28, the path described by the finger 32 thereon during each revolution of said eccentric will be an ellipse, as clearly shown in dotted lines in Fig. 4 of the drawings, the result being that said finger is brought into engagement with one of the projections 33 upon the disk 34 and causes the said disk to move in the direction of the arrow shown in Figs. 3 and 5 of the drawings a predetermined portion of a complete turn, after which the said finger is disengaged from the said projection to be brought into engagement with the next projection in the series, and so on. In order to maintain the disk 34 stationary while the finger 32 is disengaged from a projection and brought into engagement with the next in the series, there is a centering lug 36 provided. This lug is slidably disposed in a bracket 37; its lower free end carrying a roller 38, that is adapted to coöperate with a cam 39, the latter being keyed to the driving shaft. The lug coacts with a row of apertures 40 in the disk 34, the cam and the eccentric being keyed to the shaft in such relation that immediately before the finger 32 is disengaged from a projection 33 on the disk 34, the said centering lug is forced into one of the apertures 40 and held therein until the said finger is about to be brought into engagement with the next projection in the series, when a spring 41 coiled upon the centering lug, unseats the latter. There is provided an additional means for disengaging the centering lug 36 from the disk. This means comprises an extension 42 upon the centering lug in the path of a projection 43 upon the cam 39. This projection forces the extension 42 at the proper moment downward, thereby disengaging the center lug from an aperture 40. This additional means is provided in order to prevent breakage of the moving parts of the machine in case the spring 41 should fail to act.

Above the star wheel 19 is mounted upon the table portion 18 a guide 44 for the purpose of holding the crown corks upon the said star wheel. The crown corks are fed in their inverted positions one after the other to the recesses 19' of the star wheel by any suitable means, for instance the said crown corks may be placed into a hopper and brought by suitable feeding means in proper position into a chute 45, that leads to an aperture 46 in the guide 44. Through this aperture the crown corks are caused to move by means (not shown in the drawings) one after the other into the recesses 19' in the star wheel. A device of this type is disclosed in application for U. S. Letters Patent, filed by Alexander Bogdanffy and John Alberti, on Oct. 16, 1913, under Serial #795,481. Obviously a crown cork is fed to a recess when the star wheel is at rest, the latter being mounted in such a manner upon the shaft 20 that, whenever the star wheel is at rest, one of its recesses will be in alinement with the aperture 46 in the guide 44.

The crown corks are preferably assembled on a separate machine and brought into the hopper communicating with the chute 45, although the machine herein described may be combined with and form part of the assembling machine.

The star wheel conveys the crown corks step by step to a mechanism which applies adhesive material to the exposed faces of their sealing disks. The adhesive material is obviously applied to that area of a sealing disk which is to be covered by a protecting disk 15. The mechanism comprises a container 47, holding a cementing medium in liquid form of the type above described. This container is provided with a spout 48, through which the adhesive material flows drop by drop into a, preferably, cylindrical open receptacle 49, that is rotatably mounted upon a spindle 50, the latter being fixedly secured to the table portion 18. Upon this receptacle is formed a gear 51, in mesh with a gear 52, that is keyed or otherwise fixedly attached to a shaft 53, the latter being rotatably mounted in a bearing 54, and carrying upon its lower end a cam 55, that is shown in its developed form in Fig. 9 of the drawings. This cam comprises a cylindrical member, having a peripheral groove 56, said groove comprising three vertical portions 57, which are connected by curved portions 58. In the groove is seated a lug 59, formed upon a standard 60, that is attached to or made integral with a guide 61, into which extends shiftably a rod 62, the upper reduced end 63 of which projects into the cam 55, while its lower end carries a pin 64, that is seated in a slot 65 of a lever 66. This lever is fulcrumed at 67 to a bridge 68 upon the frame 17, and carries upon its free end an anti-friction roller 69, that is in engagement with a cam 70, the latter being keyed to the driving shaft 23. The reduced portion 63 of the rod 62 is connected with the shaft 53 to cause the latter to reciprocate with the rod 62, but allowing the said shaft to rotate upon the said rod. The cam 70 elevates the rod 62, and for lowering the latter there is loosely mounted upon the same a collar 71, against which bears one end of a spring 72, that is coiled upon the said rod, its other end bearing against a shoulder 73 thereon. As the rod 62 is elevated, its collar 71 will abut against the guide 61, whereby the spring 72 is compressed. After the rod has completed its upward stroke and the cam 70 allows it to descend, the spring 72 expands, thereby forcing the rod 62 and the parts connected therewith downward, keeping continuously the anti-friction roller 69 in contact with the cam 70. As the rod 62 is reciprocated, the lug 59 coöperating with the groove 56, causes the shaft 53 to be rotated step by step. When the shaft 53 is in its uppermost position (Fig. 6), the lug 59 is in one of the curved portions 58 of said groove, as shown in dotted lines in Fig. 9 of the drawings (position I). As now the rod 62 descends, the cam 55 is given a partial turn until the lug is brought into the position indicated by the numeral II in Fig. 9 of the drawings. During the further descent of the rod, the shaft 53 is held against rotary motion, owing to the fact that the lug 59 travels in one of the straight portions 57 of the groove. During the upward motion of the rod 62, for some time the shaft 53 is held against rotary motion, but will be given a partial turn when the lug 59 reaches again one of the curved portions 58 of the cam. The purpose of this arrangement will be explained hereinafter.

To the upper end of the shaft 53 is attached a star-like bracket 74, comprising in the case illustrated three arms, in each of which is shiftably mounted a spindle 75. The lower free end of each spindle carries a cylindrical block 76 of rubber or like material. A spring 77, wound upon each spindle, causes the same to descend, its downward movement being limited by a stop 78, which is adapted to abut against the upper face of the respective arm of the bracket 74. The upper face of the bottom of the receptacle 49 is disposed a considerable distance above the upper face of the star wheel, as clearly appears from Fig. 6 of the drawings. The three spindles 75 are located in relation to the star wheel and the receptacle 49 in such a manner that one of the same is, when the shaft 53 is held against rotation, in alinement with the said receptacle and another one is adapted to move through an aperture 79 in the guide 44 into contact with the exposed face of a crown cork on said star wheel. The diameter of the aperture 79 is somewhat larger than that of the head portion of a crown cork, as appears from Fig. 6 of the drawings.

The operation of the cementing material applying device is as follows: When the rod 62 is caused to move downward, one of the rubber blocks 76 contacts with the inner face of the receptacle 49 before another one of said blocks is brought into contact with the exposed area of the crown cork in alinement with the aperture 79 in the guide 44. It is to be noted that the star wheel moves while the rod 62 and the parts carried thereby move upward, and is caused to come to a stop when the said rod moves downward or at least during that period of the downward motion when one of the rubber blocks 76 is caused to contact with the exposed face of the sealing disk of a crown cork. The rubber block coming into contact with the bottom of the receptacle 49 is coated upon its plane underface with adhesive material, and is then moved, upon the next partial turn of the shaft 53, into registering position with the aperture 79 when, in moving downward, it applies the adhesive to a portion of the exposed face of the sealing disk of the crown cork resting therebelow. The springs 77 and the spindles 75 permit a rubber block to contact with a sealing disk for some time, the stroke of the rod 62 being greater than the distance between the sealing disk and the lower face of a block 76, considering the highest position of a block. Inasmuch as the upper face of the bottom of the receptacle 49 is disposed a considerable distance above the star wheel, a rubber block will be in contact with the bottom of the receptacle 49 for a longer period of time than the block is in contact with a sealing disk. There will be ample time thus to coat the underface of a block with adhesive. Inasmuch as the receptacle 49 is rotated, the rubber blocks will contact always with other spots of the receptacle 49, and inasmuch as a rubber block, when in the receptacle, is dragged along the bottom thereof, a proper coating of a block therein will take place.

The crown corks to which adhesive has been applied are conveyed by the star wheel to the means which cuts the protecting disks from a strip and places the same into the crown corks. The strip of metal or other material, from which the protecting disks are to be cut, is wound upon a reel 80, which is suitably journaled in a bracket 81. From this reel the strip is conducted into a guide 82, to pass between feeding rollers 83 and 84. The feeding roller 83 is journaled in the table portion of the machine frame, while the roller 84 is journaled in bearings 85, which project above the table portion and are under the tension of springs 86, forcing the roller 84 toward the roller 83. To the spindle of the roller 84 is fixedly attached a gear 87, in mesh with a pinion 88, that is keyed to the spindle of the roller 83. The roller 84 is actuated by a pawl and ratchet-wheel mechanism. For this purpose a ratchet wheel 89 is fixedly attached to the spindle of the roller 84, in mesh with a pawl 90, that is pivoted at 91 to a frame 92, the latter being oscillatably mounted upon the spindle of the roller 84. To this frame is pivoted at 93 a connecting bar 94, the other end of which is pivoted at 95 to the lever 30 above described. The lever is actuated, as above described, by the eccentric 26. When this eccentric moves the connecting bar in the direction of the arrow indicated in Fig. 10, the frame 92 is shifted so as to bring the pawl 90, which is under the tension of a spring 96, into engagement with one of the teeth of the ratchet wheel, and as the said connecting bar moves in the opposite direction, the feeding rollers are caused to rotate and to advance the strip 97, from which the protecting disks are to be cut, to the cutting means of the machine. The cutting means comprises a tubular punch 98, secured in any suitable manner to a slide 99, that is adapted to reciprocate in a vertical guide 100, the latter being attached to the table portion of the machine frame. The slide is actuated from the driving shaft 23 in the following manner: Upon the said driving shaft is mounted an eccentric 101, its strap 102 having an eccentric rod 103, that is pivoted at 104 to the said slide. The eccentrics 101 and 26 are timed in such a manner that whenever the star wheel is in motion, the slide 99 is caused to move upward and, whenever the star wheel is at rest, the said slide moves downward, whereby the punch 98 cuts a protecting disk from the strip 97, which disk is automatically forced through an opening 105 in the guide 44 into a crown cork, that is held stationary in alinement with the said opening. The means for forcing the disk into the crown cork comprises a stem 106, part of which is disposed within the tubular punch 98, its upper end projecting above the said punch and being provided with a head 107. A spring 108, coiled upon the said stem, rests against the said head and the slide. With the head coöperates a lever 109, that is fulcrumed at 110 and 111 to the guide 100 and slide 99, respectively. This lever is disposed above the head of the stem 106. When, therefore, the slide moves downward and cuts a protecting disk, the lever 109 will be brought into contact with the head 107 after the cutting operation is performed, but before the downward stroke of the slide is completed. After engagement, the stem will be forced downward by the lever 109 and the protecting disk into the crown cork. Upon the upward stroke the spring 108 expands and returns the stem to the position shown in Fig. 10 of the drawings.

The protecting disk having been deposited in the crown cork, the latter is transported by the star wheel within the reach of heating means, which coagulates the cementing medium so as to form a firm union between the protecting and sealing disks, said heating means serving at the same time to flatten the protecting disk to prevent the formation of wrinkles which would materially decrease the value of the product obtained. For this purpose one or more plungers may be used, which may be heated in any suitable manner. In the case illustrated in the drawings there are three plungers made use of, denoted in their order by the numerals 112, 113 and 114. These plungers are carried by and fixedly attached to a bracket 115, that is secured to a reciprocable rod 116, mounted in guides 117. Upon the lower end of this rod is formed a pin 118, seated in a slot 119 of a lever 120, that is fulcrumed at 121 to the frame of the machine, and provided upon its free end with an anti-friction roller 122, coöperating with the cam 39 above described. A spring 123, coiled upon the rod 116 and bearing against a head 124 upon the lower portion thereof and against one of the guides 117, holds continuously the anti-friction roller 122 in contact with the cam 39 and causes a downward movement of the plungers. These plungers are heated in the case illustrated in the drawings electrically, the electric conductors being shown at 125, but the means which translate the electric energy into heat has not been shown, as the same is well known and does not form part of this invention. The rod 116 is caused to move on its upward stroke when the star wheel is moving, and to descend when the said star wheel is at rest, whereby the heated plungers move through apertures 126 in the guide 44 into contact with the protecting disks in three neighboring crown corks, the apertures 126 being obviously in alinement with recesses in the star wheel when the latter is at rest. Heat is thus transmitted by the protecting disks, which are in contact with the plungers, to the cementing medium, which is thereby coagulated, and forms a firm union between the protecting and sealing disks. The underface of the plunger 112, which is the first in order to contact with a sealing disk, is convex, so that it comes into contact with the central portion only of a protecting disk. The underface of the next plunger in the series, towit: plunger 113, is less convex so that it will contact with a larger area of a protecting disk, and the underface of the plunger 114 is flat, thus making contact throughout the area of a protecting disk. The purpose of this arrangement is to expel air between the protecting and sealing disks, which air would prevent a proper union between the same. Another purpose of this arrangement is to gradually and effectively flatten the protecting disks, or in other words to prevent the formation of wrinkles in the said disks, which greatly impair the commercial value of crown corks of this type.

After this operation, the crown corks are advanced to a chute 127, into which they are caused to move by an abutment 128 upon the machine frame. In this chute the crown corks slide into a collecting receptacle (not shown).

What we claim is:—

1. In a machine for applying protecting disks to closures of the cap variety, the combination with means for applying a cementing material to the exposed face of the sealing disk of the complete closure, means for placing a protecting disk on top of and in contact with the cementing material, and means for applying pressure to the closure for maintaining said contact.

2. In a machine for applying protecting disks to closures of the cap variety, the combination with means for applying a cementing material to the exposed face of the sealing disk of the complete closure, means for placing a protecting disk on top of and in contact with the cementing material, and means for applying pressure to the closure for maintaining said contact and flattening the protecting disk.

3. In a machine for applying protecting disks to closures of the cap variety, the combination with means for applying a cementing material to the exposed face of the sealing disk of the closure, means for placing a protecting disk on top of and in contact with the cementing material, and a plurality of plungers acting in succession for applying pressure to the closure for maintaining said contact, the acting underface of the last plunger in the series being plane and those of the others convex, whereby they flatten gradually the protecting disk.

4. In a machine for applying protecting disks to closures of the cap variety, the combination with means for applying to the exposed face of the sealing disk of the complete closure a suitable cementing medium adapted to be coagulated by heat, means for placing a protecting disk on top of and in contact with the cementing medium, and means for placing the parts of the closure under pressure and coagulating the cementing medium while the pressure is maintained.

5. In a machine for applying protecting disks to closures of the cap variety, the combination with means for applying to the exposed face of the sealing disk of the complete closure a suitable cementing medium adapted to be coagulated by heat, means for placing a protecting disk on top of and in contact with the cementing medium, and a heating plunger for placing the parts of the closure under pressure and coagulating the cementing medium while the pressure is maintained.

6. In a machine for applying protecting disks to closures of the cap variety, the combination with means for applying to the exposed face of the sealing disk of the closure a suitable cementing medium adapted to be coagulated by heat, means for placing a protecting disk on top of and in contact with the cementing medium, and a plurality of heated plungers acting in succession for placing the parts of the closure under pressure and coagulating the cementing medium while the pressure is maintained, the acting underface of the last plunger in the series being plane and those of the others convex, whereby they flatten gradually the protecting disk.

7. In a machine for applying protecting disks to closures of the cap variety, the combination with means for applying a cementing material to the exposed face of the sealing disk of the complete closure, means for cutting a protecting disk from a strip and placing the same on top of and in contact with the cementing material, and means for applying pressure to the closure for maintaining said contact.

8. In a machine for applying protecting disks to closures of the cap variety, the combination with means for applying a cementing material to the exposed face of the sealing disk of the complete closure, means for cutting a protecting disk from a strip and placing the same on top of and in contact with the cementing material, and means for applying pressure to the closure for maintaining said contact and flattening the protecting disk.

9. In a machine for applying protecting disks to closures of the cap variety, the combination with means for applying a cementing material to the exposed face of the sealing disk of the closure, means for cutting a protecting disk from a strip and placing the same on top of and in contact with the cementing material, and a plurality of plungers acting in succession for applying pressure to the closure for maintaining said contact, the acting underface of the last plunger in the series being plane and those of the others convex, whereby they flatten gradually the protecting disk.

10. In a machine for applying protecting disks to closures of the cap variety, the combination with means for applying to the exposed face of the sealing disk of the complete closure a suitable cementing medium adapted to be coagulated by heat, means for cutting a protecting disk from a strip and placing the same on top of and in contact with the cementing medium, and means for placing the parts of the closure under pressure and coagulating the cementing medium while the pressure is maintained.

11. In a machine for applying protecting disks to closures of the cap variety, the combination with means for applying to the exposed face of the sealing disk of the complete closure a suitable cementing medium adapted to be coagulated by heat, means for cutting a protecting disk from a strip and placing the same on top of and in contact with the cementing medium, and a heating plunger for placing the parts of the closure under pressure and coagulating the cementing medium while the pressure is maintained.

12. In a machine for applying protecting disks to closures of the cap variety, the combination with means for applying to the exposed face of the sealing disk of the closure a suitable cementing medium adapted to be coagulated by heat, means for cutting a protecting disk from a strip and placing the same on top of and in contact with the cementing medium, a plurality of heated plungers acting in succession for placing the parts of the closure under pressure and coagulating the cementing medium while the pressure is maintained the acting underface of the last plunger in the series being plane and those of the others convex, whereby they flatten gradually the protecting disk.

13. In a machine for applying protecting disks to closures of the cap variety, the combination with means for applying a cementing medium to a portion of the exposed face of the sealing disk of the closure, means for cutting from a strip of material a protecting disk of a diameter smaller than that of the sealing disk and placing the same concentrically with the sealing disk on top of and in contact with the cementing medium, and means for applying pressure to the closure for maintaining said contact.

14. In a machine for applying protecting disks to closures of the cap variety, a pressure applying means comprising a plurality of plungers, the acting surface of at least one of said plungers being plane and those of the others convex.

Signed at New York, in the county of Kings and State of New York, this 7th day of June, A. D. 1916.

EMILIO ALBERTI.
JOHN ALBERTI.

Witnesses:
 FRANZ H. D. WOLF,
 SIGMUND HERZOG.